United States Patent
Ruffin et al.

(10) Patent No.: US 9,903,475 B2
(45) Date of Patent: Feb. 27, 2018

(54) STUFFING BOX AND PACKING RINGS FOR USE THEREIN

(71) Applicant: National Oilwell Varco, L.P., Houston, TX (US)

(72) Inventors: Joshua Ryan Ruffin, Tomball, TX (US); Jeremy Michael Rappenecker, Bethlehem, PA (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 76 days.

(21) Appl. No.: 14/996,767

(22) Filed: Jan. 15, 2016

(65) Prior Publication Data

US 2017/0204974 A1 Jul. 20, 2017

(51) Int. Cl.
*F16J 15/18* (2006.01)
*F04B 39/04* (2006.01)
*F16J 15/20* (2006.01)

(52) U.S. Cl.
CPC ............ *F16J 15/183* (2013.01); *F16J 15/181* (2013.01); *F16J 15/182* (2013.01); *F16J 15/20* (2013.01); *F04B 39/041* (2013.01); *F16J 15/18* (2013.01)

(58) Field of Classification Search
CPC F16J 15/18; F16J 15/181; F16J 15/182; F16J 15/183; F16J 15/20; F04B 39/041
USPC ........................................ 277/513, 514, 515
See application file for complete search history.

(56) References Cited

U.S. PATENT DOCUMENTS

| | | | | |
|---|---|---|---|---|
| 641,825 A | * | 1/1900 | Boulet | F16J 15/182 277/512 |
| 1,828,178 A | * | 10/1931 | Fox | F16J 15/28 277/514 |
| 1,879,855 A | * | 9/1932 | Morton | F16J 15/28 277/513 |
| 2,027,653 A | | 1/1936 | Roye | |
| 2,238,654 A | * | 4/1941 | Maier | E21B 21/02 277/329 |
| 2,417,828 A | | 3/1947 | Joy | |

(Continued)

FOREIGN PATENT DOCUMENTS

| FR | 739797 A | * | 1/1933 | ............ F16J 15/182 |
|---|---|---|---|---|
| GB | 561321 A | | 5/1944 | |

OTHER PUBLICATIONS

Machine Translation of FR 739797.*

(Continued)

*Primary Examiner* — Nicholas L Foster

(74) *Attorney, Agent, or Firm* — Conley Rose, P.C.

(57) ABSTRACT

A packing ring is disclosed for sealingly engaging a movable rod member within a stuffing box having an internal cavity. In an embodiment, the packing ring includes a carrier and a sealing ring mounted to the carrier. The sealing ring is configured to sealingly engage with an outer surface of the rod when the rod is disposed within the internal cavity. The carrier includes a radially outer surface that is configured to sealingly engage with an internal surface of the stuffing box. In addition, the carrier includes a radially inner surface that is proximate to an outer surface of the rod when the rod extends through the stuffing box. Further, the carrier includes a plurality of lubrication grooves each groove extending from the radially outer surface to the radially inner surface and configured to convey a lubricant flow between the radially outer surface and the radially inner surface.

16 Claims, 8 Drawing Sheets

(56) References Cited

U.S. PATENT DOCUMENTS

| | | | |
|---|---|---|---|
| 2,586,871 A * | 2/1952 | Shields | F16J 15/183 |
| | | | 277/515 |
| 3,048,412 A | 8/1962 | Baker | |
| 3,164,388 A | 1/1965 | Ellis | |
| 3,194,568 A * | 7/1965 | Payne | F04B 39/041 |
| | | | 277/514 |
| 3,282,594 A | 11/1966 | Wheeler | |
| 3,474,734 A * | 10/1969 | Stogner | F04D 29/106 |
| | | | 277/513 |
| 5,088,745 A | 2/1992 | Peppiatt et al. | |
| 5,135,238 A * | 8/1992 | Wells | F16J 15/183 |
| | | | 277/514 |
| 5,209,495 A | 5/1993 | Palmour | |
| 5,622,371 A | 4/1997 | Angelo et al. | |
| 5,845,909 A | 12/1998 | Angelo et al. | |
| 6,234,490 B1 | 5/2001 | Champlin | |
| 7,108,058 B2 | 9/2006 | Pippert | |
| 8,267,635 B2 | 9/2012 | Brey | |
| 2005/0103505 A1 | 5/2005 | Lappin | |

OTHER PUBLICATIONS

International Patent Application No. PCT/US2016/066855 International Search Report and Written Opinion dated Feb. 17, 2017 (13 pages).

\* cited by examiner

STUFFING BOX AND PACKING RINGS FOR USE THEREIN

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates to a stuffing box to sealingly engage with a rod member that passes therethrough. More particularly, this disclosure relates to a stuffing box suitable for oilfield operations to sealingly engage a pump rod extending to a downhole pump, and to improved packing rings for use within a stuffing box.

Stuffing boxes are used in various applications for sealing with a rod-like member that passes through the stuffing box and either reciprocates or rotates relative to the stuffing box during operations. The stuffing box sealingly engages with the rod member to retain fluid pressure, thereby allowing the rod member to extend through the stuffing box and into a sealed chamber, which is typically fluid pressurized. A plurality of axially stacked packing rings or packing glands seal between the body of the stuffing box and the reciprocating or rotating rod member. The packing rings are axially compressed or loaded by adjusting a gland member that is moveable relative to the stuffing box body, thereby exerting a compressive force on the packing rings to result in enhanced sealing. If the stuffing box leaks, the gland member may be tightened to increase the loading on the packing rings, thereby re-sealing the packing rings with the rod member. Packing rings or packing glands of the stuffing box are thus distinguishable from conventional seals, which generally are not provided in a stacked arrangement, are not axially compressed by mechanical forces, and cannot be intermittently loaded to vary sealing effectiveness.

In oilfield operations, stuffing boxes are typically used to seal a reciprocating or rotating rod string (or more particularly with a polished rod of a rod string) that in turn drives a downhole pump. In addition to oilfield operations, stuffing boxes are widely used to seal with rotating and/or reciprocating valve stems for various types of valves, and to seal with rods or pistons of pumps and other equipment that generate or handle pressurized fluid.

BRIEF SUMMARY OF THE DISCLOSURE

Some embodiments disclosed herein are directed to a stuffing box. In an embodiment, the stuffing box includes a body including an internal surface that defines an internal cavity. In addition, the stuffing box includes a plurality of packing rings stacked within the internal cavity. Each of the packing rings includes a carrier and a sealing ring mounted to the carrier. Each carrier includes a radially outer surface that sealingly engages with the internal surface of the body, and a lubrication groove configured to convey a lubricant flow between the radially outer surface and a radially inner surface of the carrier.

Other embodiments disclosed herein are directed to a packing ring. In an embodiment, the packing ring includes a carrier. In addition, the packing ring includes a sealing ring mounted to the carrier and configured to sealingly engage with an outer surface of a rod. The carrier includes a plurality of lubrication grooves configured to convey a lubricant flow between a radially outer surface of the carrier and a radially inner surface of the carrier.

Still other embodiments disclosed herein are directed to a packing ring for sealingly engaging a movable rod member within a stuffing box having an internal surface defining a cavity. In an embodiment, the packing ring includes a carrier member and a sealing member. The carrier member includes a central axis, a first end including a first frustoconical surface, and a second end opposite the first end, the second end including a second frustoconical surface that is parallel to and axially spaced from the first frustoconical surface. In addition, the carrier member includes a radially outer surface that extends between the first end and the second end and engages with the internal surface of the stuffing box, a radially inner surface that extends between the first end and the second end, and an annular mounting recess extending into the radially inner surface. Further, the carrier member includes a plurality of lubrication grooves each extending from the radially outer surface to the radially inner surface and into the first frustoconical surface. The lubrication grooves are evenly angularly spaced about the central axis, and wherein each lubrication groove is configured to receive a lubricant therein to convey the lubricant between the radially outer surface and the radially inner surface. The sealing ring mounted within the annular mounting recess of the carrier member and is configured to sealingly engage with an outer surface of the rod when the rod extends through the internal cavity.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION OF EXEMPLARY EMBODIMENTS

Figure 1:
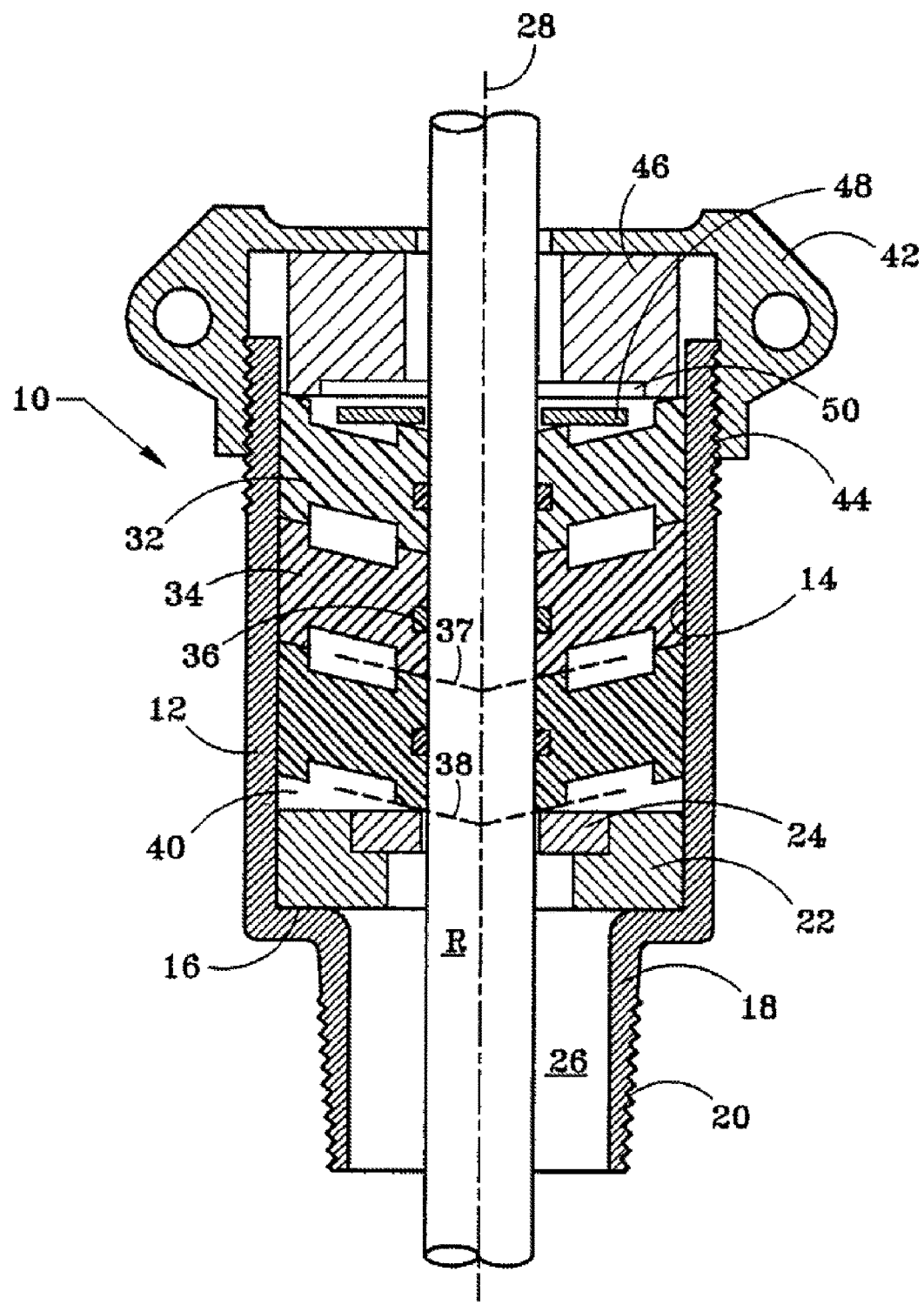
FIG. 1 is side partial cross-sectional view of a stuffing box.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

As previously described, in a stuffing box a plurality of axially stacked packing rings sealingly engage both a body of the stuffing box and the reciprocating (or rotating rod extending therethrough. Thus, it is desirable to inject lubricant within the stuffing box to reduce the friction between the packing rings and the moving rod to, facilitate the relative movement of the rod, decrease wear, and increase the useful life of the packing rings. Conventionally, lubricant is injected within a stuffing box axially outside of the axially outer most packing rings (e.g., axially above the uppermost ring and/or axially below the lower most ring for a stuffing box having its longitudinal axis oriented in the vertical direction). However, the sealing engagement between the packing rings, the body of the stuffing box, and the rod generally does not allow the injected lubricant to migrate to the other packing rings within the stuffing box. As a result, packing rings within a conventional stuffing box may not receive adequate lubricant such that the friction between the rod and the stuffing box is not adequately reduced and the packing rings within the stuffing box wear in an uneven or non-uniform fashion. Accordingly, embodiments disclosed herein include stuffing boxes including axially stacked packing rings that include one or more lubrication grooves extending between the radially inner and radially outer surfaces of the packing rings, to allow lubricant to more easily migrate toward the reciprocating (or rotating) rod and generally throughout the packings rings of the stuffing box.

FIG. 1 depicts one embodiment of a stuffing box 10 according to at least some embodiments. Stuffing box 10 is arranged to sealingly engage a polished rod R of a rod string that reciprocates axially relative through the stuffing box along an axis 28 to drive a downhole pump. It should be appreciated that in alternative embodiments, stuffing box 10 may be arranged to sealingly engage a rotating polished rod (e.g., a rod R that rotates about axis 28) of a string that drives a progressive cavity downhole pump or other device. In this embodiment, stuffing box 10 is designed for sealing engagement with a solid polished rod (e.g., rod R) to retain fluids in a subterranean well, to thereby prevent their escape into the environment (e.g., outside stuffing box 10). In a broader sense, stuffing box 10 is designed for sealing with any rod member (e.g., rod R or the like) that has a cylindrical exterior surface. The rod member R may be either solid or tubular (i.e., hollow), and may either rotate and/or reciprocate with respect to an axis (e.g., axis 28) relative to stuffing box 10.

As shown in FIG. 1, stuffing box 10 comprises a body 12 having an interior surface 14 defining a cylindrical cavity therein for receiving a plurality of stacked packing glands or packing rings 32. Cylindrical interior surface 14 defines the stuffing box central axis 28, which for the depicted embodiment will be understood to be a vertical axis. In this embodiment, each packing ring 32 has a similar configuration so that the packing rings 32 may be stacked in any order; however, in other embodiments one or more of the packing rings 32 (e.g., the uppermost or the lowermost packing ring 32) could have a modified or different configuration. Three (3) stacked packing rings 32 are shown in FIG. 1, although any number of packing rings 32 may be used depending on the application and the configuration of body 12.

For purposes of clarity and simplicity, it should be understood that when the terms "downward", "below", "upward" or "above" are utilized herein, these terms are relative terms to be construed in light of the embodiment as shown in FIG. 1 (particularly the orientation of the embodiment of FIG. 1), wherein the stuffing box body has a vertical axis 28, and the rod member R passing through the stuffing box similarly has a vertical axis that is aligned with axis 28. It should be appreciated however that in other embodiments, stuffing box 10 may be oriented differently, so that the rod member R (and thus axis 28) may be horizontal or may be inclined (i.e., angled between the vertical and horizontal directions).

The body 12 has a lowermost packing support surface 16, which may be a planar horizontal surface extending perpendicular to the central axis 28. A neck 18 extends downwardly from the body 12 and includes external threads 28 for mating connection to a wellhead (not shown) at the surface of a well bore. In a typical application, the well bore is employed to recover oil or other hydrocarbons from a well. Accordingly, the cylindrical interior bore 26 that loosely receives a rod R is exposed to well fluids, which may include hydrocarbons, water, steam, sand or other solid particles, carbon dioxide and/or hydrogen sulfide. Packing ring seat 22 is supported on the planar surface 16 and preferably includes a replaceable bushing 24 that has an interior diameter only slightly greater than the diameter of the rod R.

An upper gland cap or gland member 42 may be threadably connected to the stuffing box body 12 by threads 44.

The lower end of gland ring 46 engages the radially outward portion of the uppermost packing ring 32 to provide a desired axial loading on the packing rings 32. The packing rings 32 as shown in FIG. 1 are substantially in their initial installed position. After a breaking in period, the packing rings 32 may need to be loaded to maintain sealing integrity with both the body 12 and the rod R. The sealing effectiveness of the packing rings 32 may be enhanced by rotating the gland member 42 on the body 12 to lower the ring 46, thereby axially loading each of the packing rings 32. In certain embodiments, the radially outward portion, and preferably the radially outward 20 to 25% of the packing rings 32 is loaded while the radially inward portion of the packing rings 32 is either out of engagement with the gland member 42 or, if engaged by the gland member 42, is not highly loaded. An upper bushing 48 is provided in cavity 50 within the ring 46, and prevents extrusion of the uppermost packing ring 32 between the rod R and the ring 46. Bushing 48 may thus move radially within cavity 50 within gland ring 46 if the rod R becomes misaligned relative to the axis 28 of the stuffing box. Although not shown in FIG. 1, it should be understood that an oversized cavity may be provided in the lower seat 22, thereby allowing the lower bushing 24 to similarly move radially relative to the lower seat 22 during misalignment of the rod R.

Figure 2:
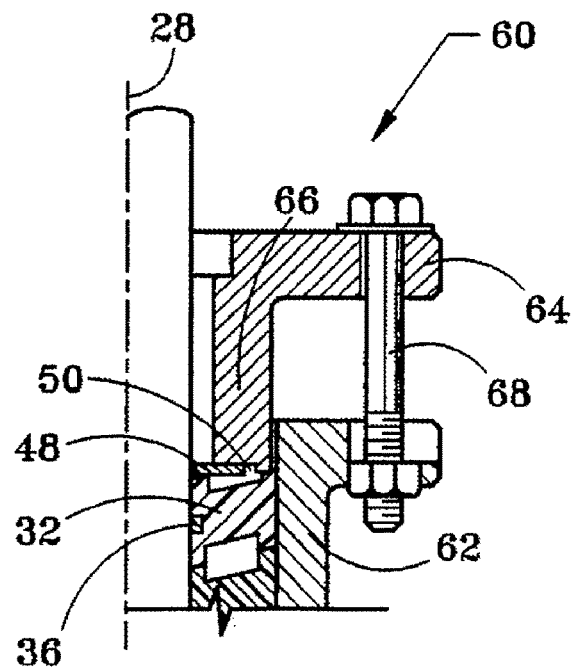
FIG. 2 is side partial cross-sectional view of an upper portion of an alternative embodiment of a stuffing box of FIG. 1, with axial adjustment between the gland member and the stuffing box body being provided by a plurality of circumferentially spaced bolts.

Referring to FIG. 2, an alternative embodiment of an oilfield stuffing box 60 is disclosed with a stuffing box body 62 including an upper flange having a plurality of circumferentially spaced holes therein. A gland member 64 is provided with a lower portion 66 integrally connected to its upper portion, such that the lower portion 66 engages the uppermost packing ring 32. The circumferentially spaced holes in the body 62 and in the gland member 64 are each aligned for receiving a conventional adjustable securing member, such as bolt 68. The axial loading of the packing rings 32 may be affected by tightening the plurality of circumferentially spaced bolts 68, thereby lowering the gland member 64 to load the packing rings 32 as previously described. In the embodiment of FIG. 2, the gland member 64 has been tightened so that the lower end of portion 66 axially loads the plurality of packing rings 32. The bushing 48 is axially sandwiched between portion 66 and the uppermost packing ring 32, but may move radially within oversized cavity 50.

It is to be understood that various types of gland members or gland caps (e.g., gland members 42, 64) may be utilized in other embodiments, and various techniques may be employed to axially move or lower the gland cap to intermittently load the packing rings (e.g., packing rings 32) and increase sealing effectiveness. The gland cap or gland member may also be provided with an oil reservoir so that clean oil may be used to lubricate the polished rod R as it reciprocates through the stuffing box. Also, the gland member may be provided at the lower end of the stuffing box body (e.g., stuffing box 10) if the fluid to be sealed by the stuffing box is provided above the stuffing box body.

Figure 3:
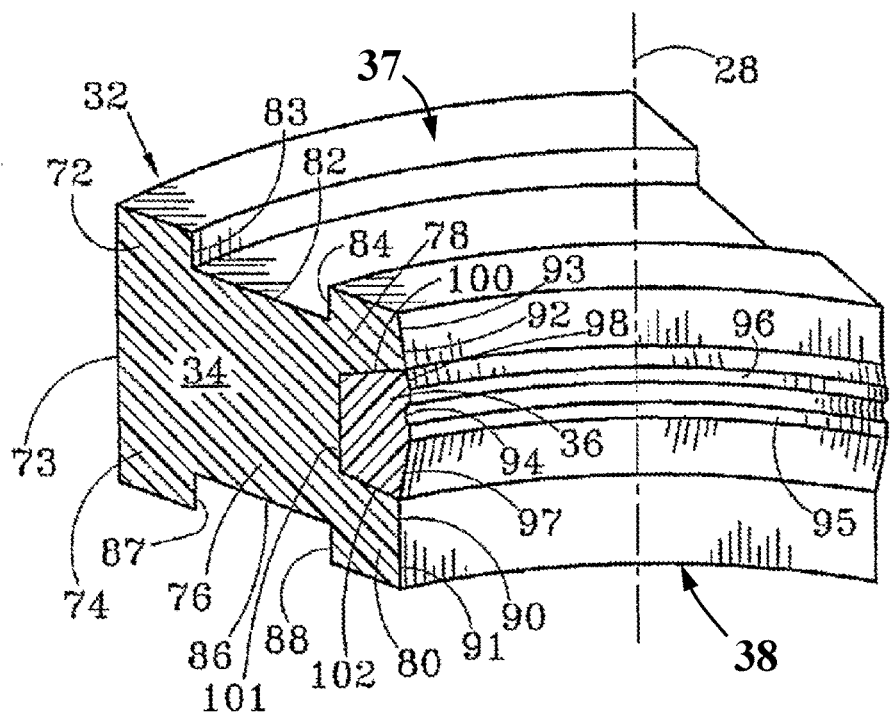
FIG. 3 is a detailed perspective view of one of the packing rings of FIG. 1.

Referring to FIGS. 1 and 3, an embodiment of packing ring 32 includes a rubber carrier ring 34 and a dynamic sealing ring 36 supported on and in sealing engagement with the rubber carrier 34. The rubber carrier 34 provides a normally static seal with the stuffing box body, while the seal ring 36 provides the primary dynamic seal with the rod member R and is in static sealing relationship with the rubber carrier 34. In some embodiments, a radially inner groove in the rubber carrier 34 is provided for receiving the dynamic sealing ring 36, and the sealing ring 36 accordingly may be easily removed and replaced from the rubber carrier 34, as discussed hereafter. In other embodiments, the dynamic sealing ring 36 may be bonded or otherwise secured to the rubber carrier 34. It is to be understood that each rubber carrier 34 and each thermoplastic dynamic sealing ring 36 may include a slit along its periphery to allow each packing ring to be split apart and placed about and subsequently removed off the rod R. For many applications, it is desirable to orient each packing ring 32 when disposed within the body 12 such that the slits of the packing rings are not circumferentially aligned (e.g., with respect to axis 28), since alignment of each of the slits of stacked packing rings may impair the sealing ability of the packing rings 32.

As shown in FIG. 1, each packing ring 32 has a tapered upper surface 37 and a tapered lower surface 38. In its initial installed position, each tapered surface 37, 38 is inclined relative to a plane perpendicular to the axis 28, for example, at an angle of from 5° to 20°, inclusive. As explained subsequently, this angle may decrease as the packing rings are loaded. The planar upper and lower tapered surfaces 37 and 38, respectively, may thus have a frustoconical configuration, and are inclined at the same angle so that the packing rings 32 may be stacked with the lower tapered surface 38 of one packing ring 32 being in mating engagement with the upper tapered surface 37 of an adjoining packing ring 32. The generally conical configuration of the packing rings 32 facilitates stacking the packing rings 32 on the seat 22 and the bushing 24, and provides a fluid pressure enhanced seal between the rod R and the body 12. Each frustoconical surface 37, 38 has an inverted apex that is substantially aligned with the axis 28, with the inverted apex being below the respective tapered surface 37, 38 and opposite the gland member 42.

Referring again to FIGS. 1 and 2, it should be understood that by lowering the respective gland member 42,64 relative to the body 12, 62 along axis 28, the lower end of the ring member 46 (or gland member 64 in the embodiment of FIG. 2) engages the radially outward portion of the uppermost packing rings 32 to axially load the radially outward portion of each packing ring 32. The gland member 64 may thus exert little if any axially compressive force on the radially interior portion of each packing ring 32. As is apparent from FIG. 1, this loading of the radially outer portion of each packing ring 32 wedges each packing ring 32 between the interior surface 14 of the body 12 and the rod R, since the radially interior portion of each packing ring 32 is prevented from moving axially downward by engagement of the radially inner portion of the lowermost packing ring 32 with a bushing 24, and by engagement of the radially interior portion of each higher packing ring 32 with an adjoining lower packing ring 32. The axial loading force on the radially outward portion of one packing ring 32 is thus transmitted to the radially outward portion of the lower packing ring 32, so that each packing ring 32 is loaded. This axial loading will move the radially outer portion of each packing ring 32 downward to slowly fill the cavity 40 between the lowermost packing ring 32 and the seat 22. As the packing rings 32 are loaded, the radially inner portion of the uppermost packing ring 32 may tend to extrude into the cavity between the gland member 42 and the rod R, but this extrusion is prevented by the bushing 48. The bushing 48 may move radially relative to the gland member 42 due to the enlarged configuration of the cavity 50 within the ring 46. In the embodiment of FIG. 1, limited radial movement of the gland ring 46 with respect to the gland member 42 and the body 12 is also permitted due to a variance between the outer diameter (O.D.) of the ring 46 and the inner diameter (I.D.) of body 12.

Referring again to FIG. 3, packing ring 32 is depicted prior to being installed within a stuffing box body, and thus is not loaded. The rubber carrier 34 of the packing ring 32 has a radially outer cylindrical surface 73 extending axially between the ends of the radially outer upper and lower annular legs or supports 72 and 74 (and thus axially between upper and lower tapered surfaces 37, 38, respectively). The inclined upper surface 37 of the rubber carrier 34 is provided with an upper annular recess or cavity having a generally U-shaped configuration with base 82 and sidewalls 83 and 84. The inclined lower surface 38 of the rubber carrier 34 has a similar lower annular recess or cavity with a base 86 and sidewalls 87 and 88. The radially inner portion of the rubber carrier 34 has upper and lower legs or supports 78 and 80 that are similar to the legs 72 and 74. The upper and lower annular recesses (formed by surfaces 82, 83, 84 and 86, 86, 88, respectively) in the rubber carrier 34 form an axially central body portion 76 of the rubber carrier 34. The thermoplastic dynamic seal 36 is mounted on this central body portion 76 so that, during loading of each packing ring 32, a radial inwardly directed force is transmitted through the central body portion 76 of the rubber carrier to press on the thermoplastic dynamic seal 36 toward sealing engagement with the rod member R.

The thermoplastic dynamic seal 36 is provided within the groove formed in the radially inner surface of the rubber carrier 34, with the groove having a base 101 and the top and bottom sides 100 and 102, respectively. The inner surface of the thermoplastic dynamic sealing member 36 may have various configurations, although in this embodiment the inner surface of the annular ring 36 includes a lower sealing surface 95 and an upper sealing surface 96 axially separated by an annular recess 94. The axial length of each sealing surface 95 and 96 is relatively short to minimize the contact area between the thermoplastic dynamic seal 36 and the rod member R, and to allow the radial inwardly directed forces transmitted through the rubber carrier 34 to be exerted on a relatively small area, thereby creating a relatively high unit loading force on each sealing surface 95 and 96. Each surface 95 and 96 is an axially short cylindrical surface with sidewalls parallel to the central axis 28. Extending downward from the surface 95 is a slightly inclined surface 97 (i.e., a downward facing frustoconical surface 97) that projects radially outward slightly in the downward direction. Similarly, an inclined surface 98 (i.e., an upward facing frustoconical surface 98) is provided above the sealing surface 96 and projects slightly radially outward in the upward direction. After wear of the thermoplastic dynamic sealing ring 36, the axial length of the sealing surfaces 95 and 96 may thus slightly lengthen since radial wearing of the surfaces 95 and 96 will slowly decrease the axial length of the inclined surfaces 97 and 98.

In the embodiment of FIG. 3, the top surface of the dynamic seal 36 in planar engagement with top side 100 of the rubber carrier and is perpendicular to the central axis 28, while the bottom surface of seal 36 in planar engagement with the bottom side 102 of the rubber carrier and is tapered to project downward (away from the gland member 42) while moving radially inward. In other embodiments, the top and bottom surfaces of the dynamic seal 36 and the mating top side and bottom side of the annular groove within the rubber carrier, may each be perpendicular to the axis 28 or may each be inclined relative to axis 28. Also, the axial length of the upper tapered interior surface 98 is substantially less than the axial length of the lower tapered interior surface 97 for the dynamic seal 36 as shown in FIG. 3. In an alternative embodiment, the annular recess or groove 94 may be axially centered between the top and bottom surfaces of the dynamic seal, in which case the axial length of the upper tapered interior surface 98 may be substantially equal to the axial length of the lower tapered interior surface 97.

In at least some embodiments, a radially inner surface of the rubber carrier 34 is adapted for engagement with the rod R. The packing rings 32 as shown in FIG. 3 are in their initial condition, and have only been lightly loaded. The entire inner surface of the rubber carrier 34 extending downward from the thermoplastic dynamic seal 36 and extending upward from the thermoplastic dynamic seal 36 may be in engagement with the rod R when the packing rings 32 are fully loaded. Alternatively, the inner surface of at least part of the rubber carrier 34 may be radially recessed, so that only a portion of the rubber carrier 34 axially above or below the dynamic seal engages the rod member R. It is preferred that the axial length of an inner surface of the rubber carrier 34 in engagement with the rod R and between the base 86 of the lower annular cavity and the thermoplastic seal 36 and between the thermoplastic seal 36 and the base 82 of the upper annular cavity be relatively short, so that a small "footprint" of a rubber area is pressed into sealing engagement with the rod R. It should thus be understood that the lower cavity (e.g., defined by surfaces 86, 87, 88) allows a relatively short axial length 90 of the inner surface of the rubber carrier 34 above the base 86 to be pressed radially inward into sealing engagement with the rod R, and that the portion 91 of the inner surface of the rubber carrier R axially aligned with the lower annular cavity cannot be effectively pressed into sealing engagement with the rod R. Similarly, a relatively short upper portion 92 of the rubber carrier 34 below the base 82 of the upper annular cavity may be pressed into sealing engagement with the rod R, while the portion 93 of the inner surface of the rubber carrier 34 radially within the angled plane of the upper cavity cannot be radially pressed into sealing engagement with the rod R due to the presence of the upper annular cavity.

Carrier 34 of each packing ring 32 is preferably fabricated from a compressible material, such as rubber (natural and/or synthetic), that desirably provides the resilience to accommodate high side loading forces if the rod R becomes misaligned with respect to the stuffing box 10 (particularly axis 28). The inner surface 14 of the stuffing box body 12 may have a relatively rough finish. A rubber material for the carrier 34 is able to provide a reliable static seal over a large surface area with the interior surface 14 of the stuffing box body. Rubber carrier 34 has a high compressibility and a desired memory that allows the packing rings 32 to be infrequently loaded. Between intermittent loadings, this high compressibility and memory enable the carrier 34 to maintain high sealing integrity between the exterior surface 73 of the rubber carrier and the interior surface 14 of the body 12, and also exerts a substantial radially inward force on the thermoplastic dynamic seal 36, as explained above.

Rubber is also a preferred material for sealing with the rod member R to keep sand and other solid particles in the fluid from engaging the thermoplastic dynamic seal 36. The surface area of rubber pressed into sealing engagement with the rod R may be relatively low (e.g., at surfaces 90, 92), however, in order to minimize the amount of generated heat due to movement of the rod R on the radially inner surface of the carrier 34. Also, the inner surface of the rubber carrier 34 in sealing engagement with the rod R is lightly radially loaded relative to the radial loading on the thermoplastic dynamic seal. This loading may be easily adjusted by altering the depth of the upper and lower annular cavities (e.g., cavities formed by 82, 83, 84 and 86, 87, 88, respectively) in the rubber carrier 34 and/or the inner diameter of the surfaces 90 and 92 relative to the inner diameter of the sealing surfaces 95 and 96.

As shown in FIG. 3, the cross-section of the rubber carrier 34 has a substantially H-shaped configuration, with the radially outer annular supports or legs 72 and 74 being provided for axial loading of the stacked packing rings 32. Annular inner supports or legs 78 and 80 maintain the desired mating engagement of the inclined upper and inclined lower surfaces 37 and 38, respectively, of the packing ring 32. The depth of the upper and lower surfaces 37 and 38, respectively, may be controlled to accommodate several purposes. First, the volume occupied by the upper and lower annular cavities in each packing ring 32 is preferably sufficiently large to accommodate both thermal expansion and fluid swelling of the rubber carrier 34 when subjected to heated well fluids, thereby minimizing the likelihood of undesirably high loading forces being applied to the inner surfaces 90 and 92 of the rubber carrier due to restricted expansion forces. The upper and lower annular cavities provided by the upper and lower surfaces 37, 38 of the rubber carrier 34 are thus sized to accommodate both thermal expansion and expansion due to swelling that may occur when some rubber carrier 34 materials are exposed to certain fluids. The volume of the upper and lower annular cavities is at least 5%, and preferably at least about 8% to about 10%, of the volume of the rubber carrier 34 in order to accommodate this thermal expansion and swelling. The uppermost packing ring 32 is also free to expand into the void above the packing ring, and the lowermost packing ring 32 is similarly free to expand into the annular cavity 40. It should be noted, however, that the centrally stacked packing rings 32 also be permitted to expand, thereby preventing high thermal "hot spots" in the stacked packing rings 32. Also, it is preferable, in some embodiments, that each stacked packing ring 32 have the same configuration to minimize installation problems and inventory costs.

Secondly, the upper and lower annular cavities in the upper and lower surfaces 37, 38, respectively, of the rubber carrier 34 are preferably concentric or axially aligned so that the rubber carrier 34 may experience flexing about substantially the cross-sectional center of the rubber carrier 34. In other words, the upper and lower annular cavities allow the radially outer portion of the rubber carrier 34 to move axially downward relative to the radially inner portion of the rubber carrier 34, thereby increasing sealing effectiveness. This flexing feature of the carrier 34, as enhanced by the upper and lower annular cavities, also ensures reliable mating engagement of the tapered end after the rings 32 have been repeatedly loaded.

Thirdly, the annular cavities allow for effective controlling of the loading of the inner surfaces of the rubber carrier 34 over a relatively small area of the carrier 34 to seal with the rod R. Preferably the seal depth of the annular cavities and the axial length of the radially inner surface of the thermoplastic dynamic seal 36 are controlled such that these combined lengths are at least 70% of the axial length of the outer surface 73 of the rubber carrier 34. Accordingly, the combined length of the surfaces 90 and 92 is less than 30% of the axial length of the outer surface 73 of the rubber carrier 34, and preferably the combined axial length of the surfaces 90 and 92 is less than 25% of the axial length of the outer surface 73 of the rubber carrier 34. By deepening the upper and lower annular cavities, the area of the rubber carrier 34 that may be pressed radially inward into sealing engagement with the rod R is thus minimized.

By forming the carrier 34 from rubber or another compressible material with a high memory, the gland member 42 need only be intermittently tightened to maintain reliable sealing engagement. The axial compressive force on the radially outer surface of the rubber carriers 34 thus results in a significant radially inward compressive force on the thermoplastic dynamic seals 36 and a comparatively lighter inward compressive force on the relatively small sealing surfaces 90 and 92 of the rubber carrier 34.

The precise material for the compressible carrier 34 will depend upon the application. Suitable compressible materials for the rubber carrier 34 of the packing rings 32 for most hydrocarbons applications will be a selected material from a group consisting of styrene-butadiene, nitrile-butadiene (including hydrogenated NBR), and hexafluoropropylenevinylidene fluoride (FKM) copolymers.

The dynamic seal 36 is preferably formed from a plastic material that has a low coefficient of friction with the exterior surface of the moving rod member R. The reduced coefficient of friction and the relatively small sealing area of the dynamic seal 36 results in a minimal amount of generated heat, thereby contributing to the life of both the rubber carrier 34 and the dynamic seal 36. The material for the dynamic seal ring 36 is also preferably selected to withstand attack from chemicals that may be present in the downhole fluid, such as carbon dioxide and hydrogen sulfide. The material selected for the dynamic seal 36 may be better than rubber at withstanding crusted-type deposits that may accumulate on the rod R, particularly when small amounts of steam escape past the packing rings 32. A preferred dynamic seal 36 material according to at least some embodiments may be thermoplastic material selected from a group consisting of tetrafluoroethylene (TFE), ultra-high molecular weight (UHMW) polyethylene, acetal, polyimide, polyamide, and a fiber re-enforced thermoplastic. A fabric reinforced rubber material, which has features similar to the above thermoplastic materials, may also be used for the dynamic seal 36. In the embodiments shown in the figures, a single annular dynamic seal 36 is used with each carrier 34. In alternative embodiments, two or more axially spaced dynamic seals 36 each within a respective groove or each within a common groove in the rubber carrier 34 may be provided. Also, some applications will benefit from using a combination wiper and seal arrangement. An axially lower thermoplastic seal as disclosed herein may be provided on the rubber carrier 34 axially below an annular wiper, which may be formed from a wire mesh and fabric composition. During reciprocation of the rod member R, the annular wiper acts to remove any deposits that otherwise may form on the surface of the polished rod R, thereby keeping the polished rod clean for reliable sealing engagement with the thermoplastic dynamic seal.

In at least some embodiments, the dynamic seal 36 is provided as a replaceable insert within the rubber carrier 34. A worn insert may be easily removed and replaced with a new insert. Alternatively, an insert may be removed and replaced with an insert of a different selected material. In other embodiments, the elastomeric dynamic seal 36 may be glued or otherwise bonded to the rubber carrier 34.

Figure 4:
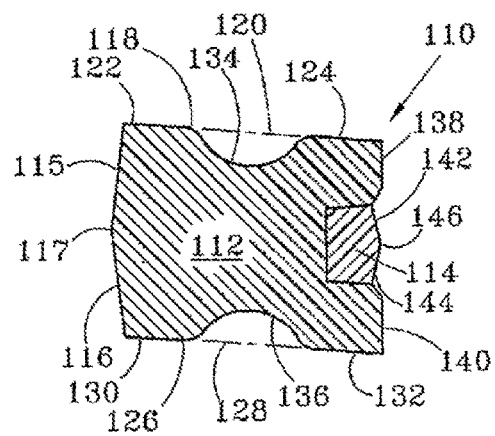
FIGS. 4, 5, and 6 are each cross-sectional views of alternative embodiments of a packing ring.
Figure 5:
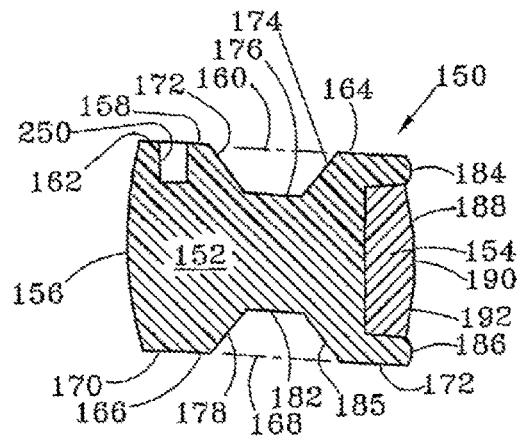
Figure 6:
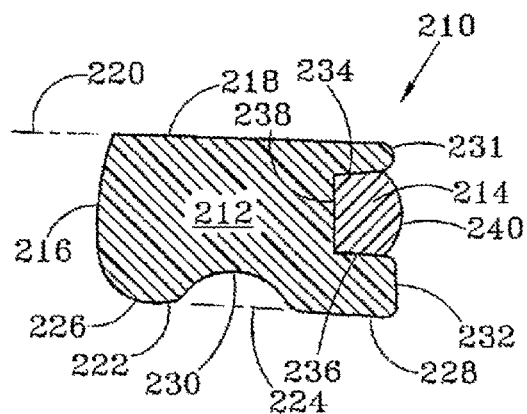

FIG. 4 illustrates an alternative embodiment of a packing ring 110, including a rubber material carrier 112, and elastomeric dynamic seal ring 114. Each of the alternative packing rings shown in FIGS. 4-6 are depicted in their pre-installed or unloaded configuration. Packing ring 110 has radially outer tapered surfaces 115 and 116 that meet at an axially centered junction 117. The tapered surfaces 115 and 116 provide static sealing engagement with the inner surface 14 of the stuffing box body 12. When the packing ring 110 is installed within the body 12 of stuffing box 10, both surfaces 115 and 116 will provide static sealing engagement. The upper end of surface 115 and the lower end of surface 116 may sealingly engage the inner surface of the stuffing box body 12 when the packing rings 110 are axially loaded, although high pressure sealing may be more effective along the axially central junction portion 117 of the rubber carrier 112.

The tapered upper surface 118 of the rubber carrier 110 as shown in FIG. 4 includes a radially outer top planar surface 122 and a radially inner top planar surface 124, each lying along a tapered plane 120. Similarly, the lower tapered surface 126 includes a radially outer portion 130 and a radially inner portion 132 each lying along the tapered lower plane 128. An upper annular cavity or groove 134 and a lower annular cavity or groove 136 are provided in the upper and lower surfaces 118, 126, respectively, with each groove 134, 136 having a generally curved bottom as shown. Thermoplastic dynamic seal 114 includes substantially a line contact seal area 146 between tapered surfaces 142 and 144. The axial length of the surface 146 will increase during wear, although preferably the axial length of the sealing surface 146 will be relatively short to minimize generated heat. The radially inner surface of the rubber carrier 112 includes an upper surface 138 and a lower surface 140 each for sealing engagement with the rod R. Again, only a small portion of the surfaces 138 and 140 will be radially pressed into sealing engagement with the rod R due to the depth of the grooves 134 and 136.

FIG. 5 depicts another embodiment of packing ring 150 comprising a rubber carrier 152 and a thermoplastic dynamic seal 154. The outer surface 156 of the rubber carrier 152 has a slightly curved configuration, thereby increasing the sealing effectiveness of the rubber carrier with the inner surface 14 of the stuffing box body 12 in the area adjacent the axially central portion of the rubber carrier 152. The tapered upper surface 158 of the rubber carrier includes an outer portion 162 and an inner-portion 164 each formed along tapered upper plane 160. The lower tapered surface 166 similarly includes a radially outer portion 170 and a radially inner portion 172 each formed along the inclined lower plane 168. An upper annular cavity or groove extends into the upper surface 158 of the rubber carrier 152 that has a base surface 176 and tapered sidewalls 172 and 174. Similarly, a lower annular cavity or groove extends into the lower surface 166 that has a base surface 182 and tapered sidewalls 178 and 185.

In the embodiment of FIG. 5, the axial length of the thermoplastic dynamic seal 154 has been increased to be slightly greater than the axial spacing between the groove surfaces 176 and 182. Accordingly, no portion of the rubber carrier 152 can be pressed radially inward when the outward portion of the rubber carrier 152 is axially loaded. Nevertheless, the rubber carrier 152 may be constructed so that annular lower sealing surface 186 and an annular upper sealing surface 184 of the rubber carrier still sealingly engage the rod member R. The axial length of the sealing surface 190 is also increased, and tapered upper and lower inner surfaces 188 and 192 are provided above and below the sealing surface 190. The embodiment as shown in FIG. 5 is particularly well suited for use in an application wherein the stuffing box 10 is not likely to encounter a large amount of solid abrasives.

Each of the designs as shown in FIGS. 3, 4 and 5 utilizes a rubber carrier with upper and lower annular cavities groove, so that the rubber carrier has a generally H-shaped configuration. The rubber carrier 212 for the packing ring 210 as shown in FIG. 6 has a single annular cavity or groove 230 in its lower surface. Carrier 212 thus includes a radially exterior surface 216, which is similar to the embodiment as shown in FIG. 5 in that the surface is slightly rounded to increase sealing effectiveness in the area adjacent the axial center of the rubber carrier 212. The rubber carrier 212 includes a tapered upper surface 218 formed along plane 220, and a tapered lower surface 222 having a radially outer portion 226 and a radially inner portion 228 each formed along the lower inclined plane 224. The annular groove 230 in the lower surface has a curved configuration, although the rubber carrier 212 could be provided with an annular groove as shown in the embodiments of FIG. 3 or FIG. 5. The annular groove 230 could also be provided in only the upper surface, so that the lower surface of each carrier with no groove engaged the grooved upper surface of a lower packing ring.

FIG. 5 also depicts a cylindrical-shaped pocket 250 in the carrier 152. In order to assist in removal of each packing ring, a plurality of circumferentially opposed threaded pockets 250 may be provided in the radially outer portion of each of the rubber carriers as described herein. A bolt or other conventional tool having a lower threaded end may then be threaded into each of two circumferentially opposed pockets 250. An upward force may be simultaneously applied to both of the bolts to raise the radially outer portion of each rubber carrier and thereby assist in removing each packing ring from its wedged position within the body 12. A removal tool is not shown in FIG. 5 since it may have any desired configuration that will allow the operator to grasp the tool once it is threaded within the pocket 250 so that an upward force may be applied to diametrically opposed sides of each packing ring. In an alternative embodiment, a tool with non-spiraling gripping teeth may be inserted into each pocket to facilitate removal of a packing ring.

Thermoplastic dynamic seal 214 as shown on the FIG. 6 embodiment is fitted within a groove provided in the rubber carrier 212 formed by base 238 and upper and lower surfaces 234 and 236. The thermoplastic dynamic seal 214 includes a curved radially interior surface 240 for sealing engagement with the rod R, although a cylindrical surface with an increasingly long axial length will be formed as the curved surface 240 wears. Thermoplastic dynamic seal 214 is substantially centered between the base of the groove 230 and the surface 218. Accordingly, a relatively thin rubber portion is provided above the seal 214 with an interior surface 231 for engagement with the rod R. Only a portion of the lower radially lower inner surface 232 of the rubber carrier 212 will be pressed axially inward when the rubber carrier 212 is loaded due to the groove 230 being provided in the lower surface 222 of the rubber carrier 212.

For each of the embodiments shown in FIGS. 3-6, the packing ring (e.g., rings 32, 110, 150, 210) in cross-section includes an axially extending radially outer leg and an axially extending radially inner leg, with at least one groove spaced radially between these legs. Each leg has a solid thickness sufficient to reliably transmit forces to an adjacent lower packing ring, and the thickness of each leg prevents the leg from buckling or moving radially from its intended position. The adjoining lower leg of one packing ring and the upper leg of a lower packing ring thus stay radially aligned. When the packing rings are axially loaded, substantial voids do not exist between stacked packing rings except for the annular voids in the upper and/or lower tapered surfaces of the packing rings, as described herein. When axially loaded, the axial length of the radially outer surface of each rubber carrier engages the inner surface of the stuffing box body, and the radially inner surface of the rubber carrier axially above and below the thermoplastic seal engages the rod member R. As previously explained, however, the entirety of these rubber carrier surfaces need not sealingly engage the stuffing box body 12 or the rod member R, and a substantial portion of the radially inner surface of each rubber carrier is not in forced sealing engagement with the rod member due to the annular grooves, thereby desirably minimizing frictionally generated heat by dynamic engagement with the rod member.

Those skilled in the art should appreciate the various features of both the rubber carriers and the thermoplastic dynamic inserts as shown in different embodiments discussed above may be employed. For example, an insert as shown in FIG. 3 and a carrier having annular upper and lower grooves as shown in FIG. 5 may be employed with radially outer surfaces and radially interior surfaces on the rubber carrier as shown in FIG. 4. The rubber carrier as shown in any of the FIGS. 3-6 may thus be modified to include any configuration of annular groove(s), and, if required, may be modified to receive any of the dynamic seals disclosed herein. Similarly, while pocket 250 is only shown extending within packing ring 150 in the embodiment of FIG. 5, it should be appreciated that similar pockets 250 may be included in any of the other packing rings discussed herein (e.g., packing rings 32, 110, 210, etc.).

When it is desired to service or replace the packing rings (e.g., rings 32, 110, 150, 210, etc.), gland member 42 (or gland member 64 shown in FIG. 2) may be removed from the body 12 (or body 62 shown in FIG. 2) and the packing rings may then be removed through the exposed upper end of the body 12, optionally using removal tools threaded in the pockets 250 in the manner previously described above if the packing rings are wedged tightly within the body 12. The packing rings may then be replaced with new rubber carriers (e.g., carriers 34, 112, 152, 212, etc.) or rubber carriers of a different selected material. Alternatively, the worn thermoplastic dynamic sealing rings (e.g., rings 36, 114, 154, 214, etc.) may be replaced with new seals or may be replaced with thermoplastic dynamic seals of a different material. Once the packing rings are stacked within the body 12 as shown in FIG. 1, gland member 42 (or gland member 64 shown in FIG. 2) may be returned to its position on the body, and a downward force exerted on the uppermost packing ring 32, thereby loading a radially outer portion of each of the packing rings to obtain a reliable static seal between the outer surface of each packing ring and the interior surface 14 of the body 12, and simultaneously creating a wedging action that exerts a radially inward directed force through the rubber carrier to the thermoplastic dynamic seals.

After a period of use, it may be necessary to tighten the gland member to obtain more reliable sealing engagement of the packing rings with the rod member R. As the gland member is tightened, it should be understood that the angle of the inclined upper and lower mating planes of the stacked gland members will decrease, so that the same axial loading force will result in an increased radial force being applied to the thermoplastic dynamic seals due to reduced wedging angle.

A bushing as shown in FIGS. 1 and 2, a metal ring at least partially fitted within the upper annular cavity of the uppermost packing ring 32, or other members may be used for preventing extrusion of the packing rings 32. The stuffing box body 12 and the gland member 42 may have various configurations. Although the packing rings are preferably "inverted" so that the apex of the tapered upper and lower surfaces (e.g., surfaces 37 and 38, respectively) is opposite the gland member 42 with respect to the corresponding tapered surface, the tapered upper and lower packing ring surfaces could project radially inward and toward the gland member 42. In this case, the interior portion of the packing rings is preferably loaded by the gland member 42, and the radially outward portion of the lowermost packing ring 32 is supported on the seat 22. The inverted design as more fully described above is preferred in at least some implementations, since desirably the outward portion of the packing rings 32 is then loaded and the inner portion of the lowermost packing ring is supported on the seat 32. Also, the inverted design utilizes high fluid pressure to form a more effective dynamic seal with the rod member R.

Another alternative embodiment of a stuffing box may include a "doublepacked" stuffing box with a plurality of upper packing rings and a plurality of lower packing rings, as generally described in U.S. Pat. No. 2,833,572, the entire contents of which are incorporated herein by reference in their entirety for all purposes. It is sometimes desirable to provide two separate and distinct sets of packing rings for application wherein higher pressures and intermittent flow are anticipated, thereby allowing one set of the packing rings to maintain a seal temporarily while the other set of packing rings is replaced. The stuffing box may also be designed for sealing engagement with a rotating rod string, in which case the stuffing box body may be configured to support the axial load on the rotating rod string, as disclosed in U.S. Pat. No. 4,480,842, the entire contents of which are incorporated herein by reference in their entirety for all purposes.

Those skilled in the art will appreciate that a stuffing box and packing rings for a stuffing box may be used for applications other than hydrocarbon recovery. The improved stuffing box and packing rings may be used to seal with a rotating valve stem, a rising valve stem, or a combination rotating and rising valve stem, and these valve stems may be used for operating various types of valves. The stuffing box and packing ring may also be used to seal with rods or pistons of pumps and other pressure generating or pressure handling equipment. It should therefore be apparent that this disclosure is well adapted to obtain the objects discussed herein. It should also be understood that certain combinations and sub-combinations are of utility and may be employed without reference to other features and subcombinations. In particular, the improved packing seals of this disclosure may be used on existing stuffing boxes.

Figure 7:
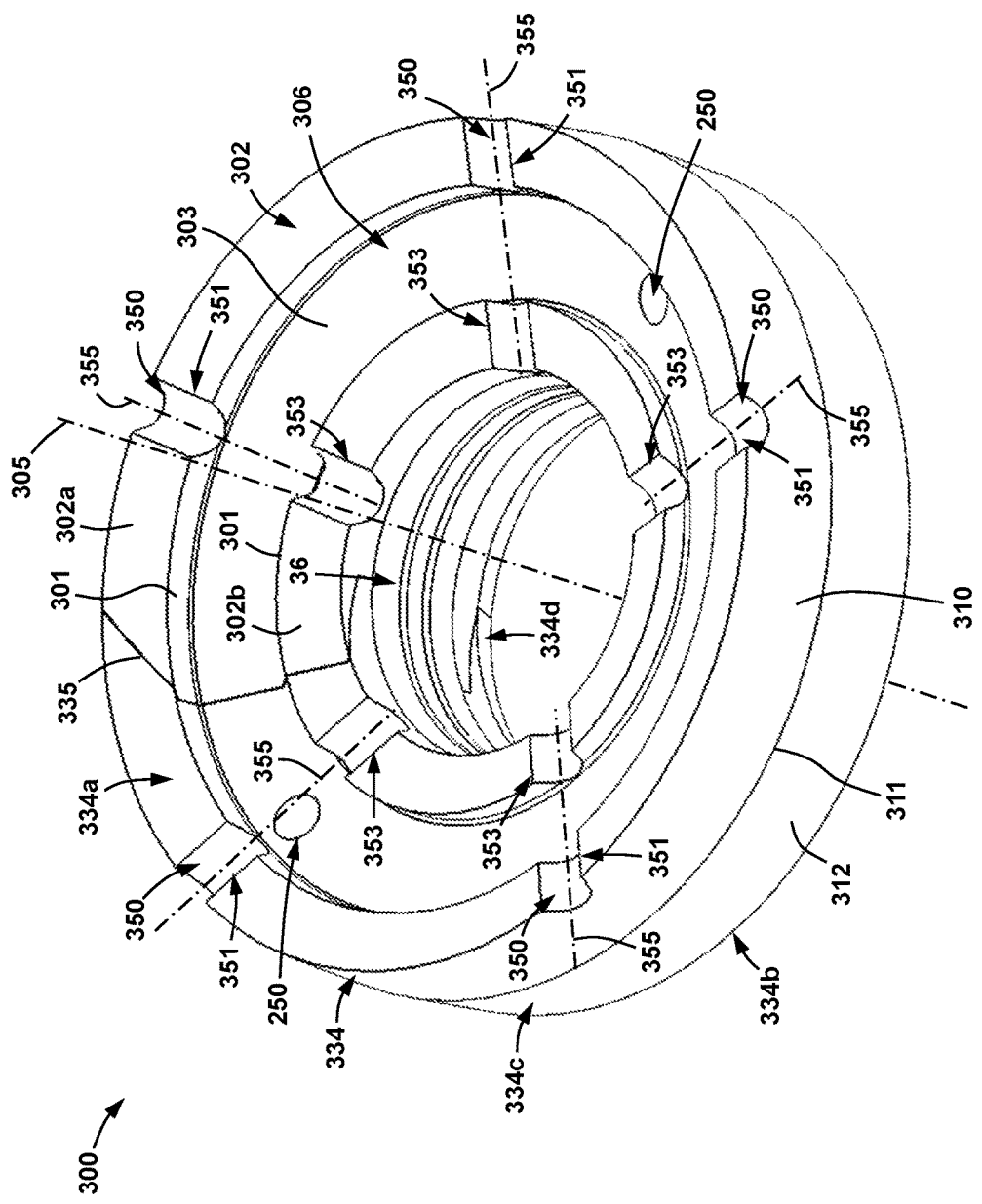
FIG. 7 is a perspective view of another packing ring for use within the stuffing box of FIG. 1 in accordance with at least some embodiments.
Figure 8:
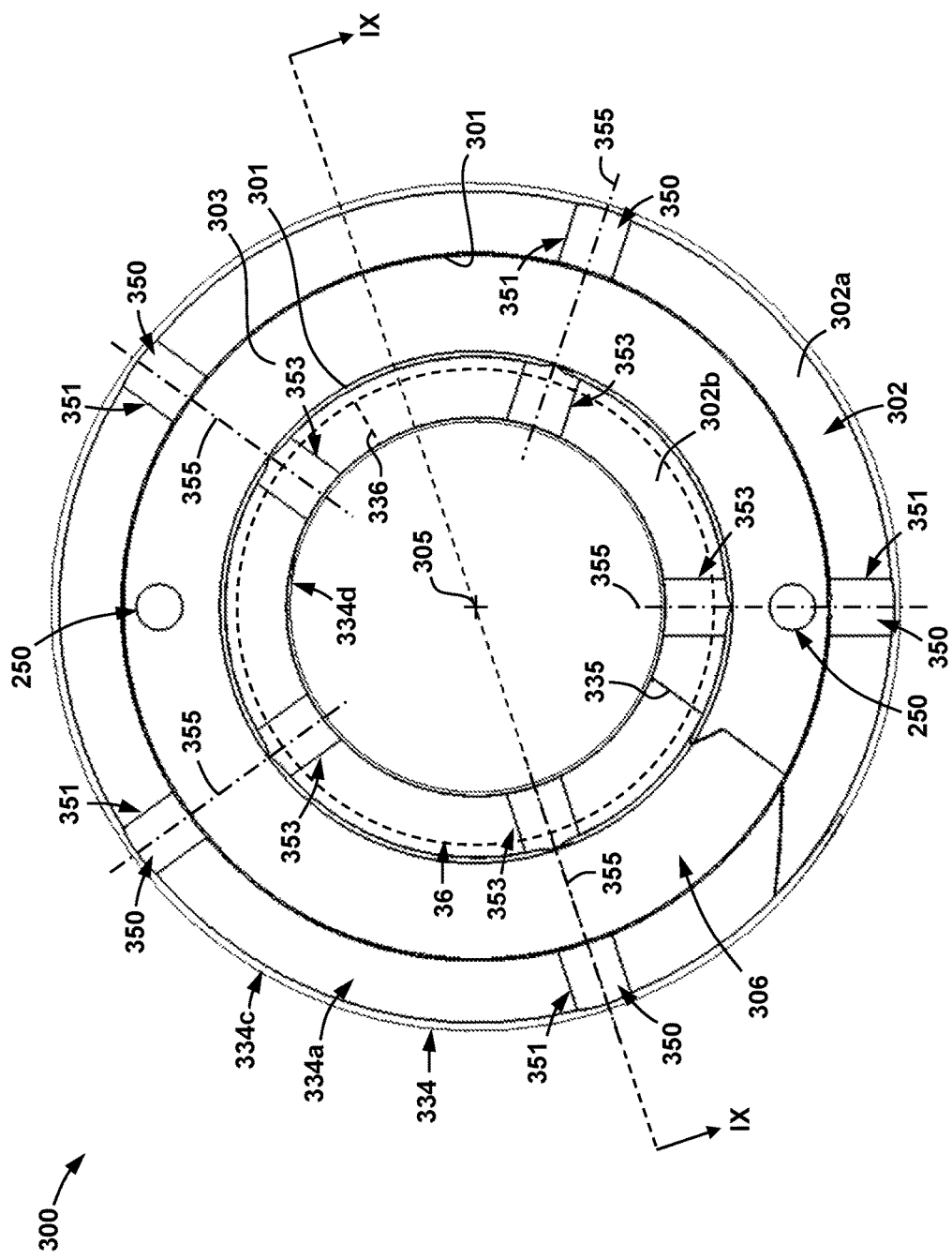
FIG. 8 is a top view of the packing ring of FIG. 7.
Figure 9:
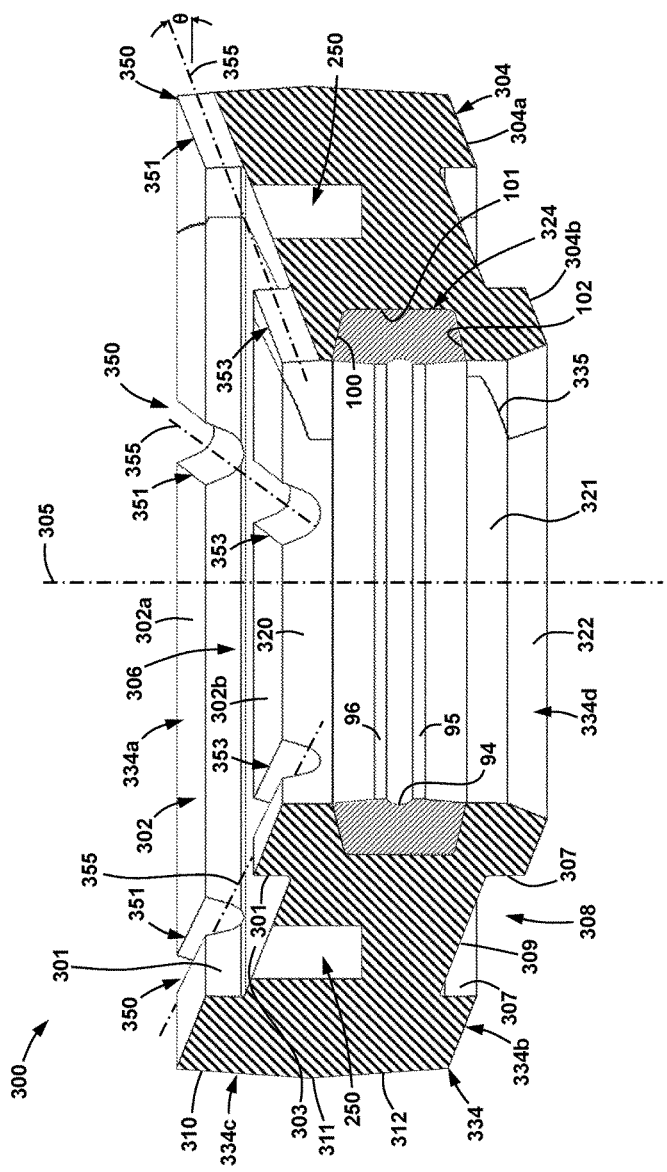
FIG. 9 is a side cross-sectional view of the packing ring of FIG. 1 taken along section IX-IX in FIG. 8.

Referring now to FIGS. 7-9, an alternative embodiment of a packing ring 300 for use within stuffing box 10 in place of one or more of the packing rings 32, previously described (see FIG. 1) is shown. Packing ring 300 generally includes a flexible carrier ring 334 and a dynamic sealing ring 36 supported on and in sealing engagement with the rubber carrier 334. Dynamic sealing ring 36 is substantially the same as previously described above for the embodiment shown in FIG. 3, and thus, a detailed description of ring 36 is omitted herein in the interests of brevity. However, it should be noted that carrier 334 may support any suitable dynamics seal ring, including, for example, rings 114, 154, 214, described herein. Carrier ring 334 includes a central axis 305, a first or upper end 334a, a second or lower end 334b opposite upper end 334a, a radially outer surface 334c extending axially between ends 334a, 334b, and a radially inner surface 334d also extending axially between ends 334a, 334b. In addition, each of the carrier ring 334 and sealing ring 36 include a corresponding slit 335, 336, respectively, that allows the carrier 334 and ring 36 to be split apart and placed about and subsequently removed off of rod R, as previously described. Further, carrier 334 may comprise any of the materials discussed above for carriers 34, 112, 152, 212.

Upper end 334a includes a first or upper frustoconical surface 302 that is angled or inclined with respect to axis 305. Similarly, lower end 334b includes a second or lower frustoconical surface 304 that is also angled or inclined with respect to axis 305. In some embodiments, upper frustoconical surface 302 and lower frustoconical surface 304 are each angled between 5 and 20°, inclusive, relative to a plane or line passing perpendicularly through axis 305 (e.g., a horizontal plane as shown in FIG. 9). Thus, in at least some embodiments upper frustoconical surface 302 is parallel to lower frustoconical surface 304, and upper frustoconical surface 302 is axially spaced from lower frustoconical surface 304 along axis 305 (i.e., the cross-sections of surfaces 302, 304 are parallel and axially spaced from one another along a cross-section including the central axis 305, such as in FIG. 9).

Radially outer surface 334c includes tapered surfaces that meet at an axially centered junction in a similar manner to surfaces 115, 116, and junction 117 described above for packing ring 110 shown in FIG. 4. Specifically, in this embodiment, radially outer surface 334c includes a first or upper frustoconical surface 310 extending from upper end 334a to a junction 311 and a second or lower frustoconical surface 213 extending from junction 311 to lower end 334b. Upper frustoconical surface 310 is an upwardly facing frustoconical surface and lower frustoconical surface 312 is a downwardly facing frustoconical surface such that junction 312 represents the radially outer most portion of radially outer surface 334c with respect to axis. In some embodiments, upper frustoconical surface 310 and lower frustoconical surface 312 may be angled relative to an axially directed plane or line between 2 and 7°, inclusive.

An annular mounting recess 324 extends generally radially outward and into radially inner surface 334d that is substantially similar to the groove defined by surfaces 100, 101, 102 of the packing ring 32 of FIG. 3. Thus, a detailed description of the recess 324 is omitted in the interest of brevity. In addition, radially inner surface 334d includes a first or upper cylindrical surface 320 extending axially between upper end 334a and recess 324, a downward facing frustoconical surface 322 extending from lower end 334b, and a second or lower cylindrical surface 321 extending axially from recess 324 to downward facing frustoconical surface 322. In some embodiments, downward facing frustoconical surface 322 may be angled with respect to an axially directed plane or line between 18 and 24°, inclusive.

A first or upper annular cavity or groove 306 extends axially inward (i.e., axially downward) from upper frustoconical surface 302 at upper end 334a, and a second or lower annular cavity or groove 308 extends axially inward (i.e., axially upward) from lower frustoconical surface 304 on lower end 334b. Thus, upper frustoconical surface 302 is divided by upper annular cavity 306 into a first or radially outer portion 302a extending from radially outer surface 334c to annular cavity 306 and a second or radially inner portion 302b extending from annular cavity 306 to radially inner surface 334d. Also, lower frustoconical surface 304 is divided by lower annular cavity 308 into a first or radially outer portion 304a extending from radially outer surface to lower annular cavity 308 and a second or radially inner portion 304b extending from lower annular cavity 308 to radially inner surface 334d.

Upper annular cavity 306 is defined by a base surface 303 and a pair of side walls 301, and lower annular cavity 308 is defined by a base surface 309 and a pair of side walls 307. Base surface 303 is an upward facing frustoconical surface that extends substantially parallel to upper frustoconical surface 302 of upper end 334a. Base surface 309 is a downward facing frustoconical surface that extends substantially parallel to lower frustoconical surface 304 of lower end 334b. A plurality of cylindrically-shaped pockets 250 extend axially into packing ring from base surface 303. The function and structure of pockets 250 is substantially the same as that described above, and thus, a detailed description of pockets 250 is omitted in the interests of brevity. However, it should be noted that in this embodiment, two (2) pockets 250 extend into packing ring 300 such that each pocket 250 is angularly spaced approximately 180° from the other pocket 250 about axis 305.

Referring still to FIGS. 7-9, carrier ring 334 also includes a plurality of lubrication grooves 350 extending between radially outer surface 334c and radially inner surface 334d along upper end 334a. As will be described in more detail below, during operations, grooves 350 carry lubricant (e.g., grease, oil, etc.) from the radially outer surface 334d of packing rings 300 to the radially inner surface 334d to lubricate the engagement between dynamic sealing ring 36 and rod R (See FIG. 1) and/or or radially inner surface 334c (e.g., surfaces 320, 321, 322) and rod R.

Each groove 350 extends axially inward to carrier ring 334 from upper frustoconical surface 302 and also extends along a respective axis 355 that is parallel to upper frustoconical surface 302. Thus, each axis 355 is disposed at an angle θ relative to a plane extending perpendicularly through the central axis 305, where the angle ranges between 5 and 20°, inclusive. In addition, grooves 350 are disposed axially above base surface 303 of upper annular cavity 306 such that groove 350 includes a first or radially outer portion 351 extending axially through radially outer portion 302a of upper frustoconical 302 surface and a second or radially inner portion 353 extending axially through radially inner portion 302b of upper frustoconical surface 302.

As is best shown in FIGS. 7 and 8, in this embodiment, packing ring 300 includes a total of five (5) lubrication grooves evenly circumferentially or angularly spaced about axis 305, such that each groove 350 is angularly spaced 72° from each immediately angularly adjacent groove 350 about axis 305. However, it should be appreciated that the number and arrangement of grooves 350 may be greatly varied in other embodiments. For example, in other embodiments, more or less than five (5) grooves are included. As another example, in some embodiments, grooves 350 (regardless of the number) are not evenly angularly spaced about axis 305. As still another example, while portions 351, 353 of each groove 350 are shown to be aligned along the respective axis 355, in other embodiments sections 351, 353 of grooves 350 may be angularly misaligned about axis 305 (i.e., sections 351, 353 of each groove 350 are disposed along different and separate axes—e.g., axis 355—that are parallel and circumferentially offset from one another about axis 305).

Figure 10A:
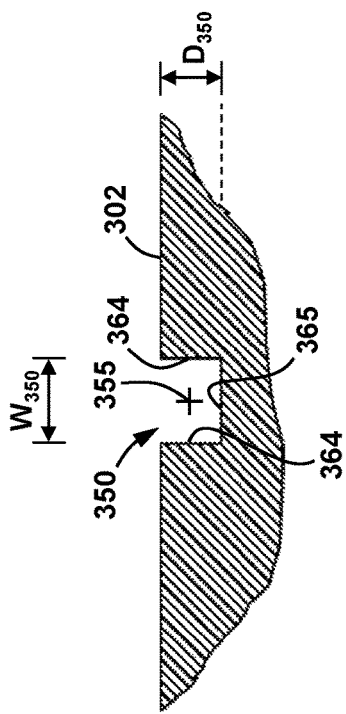
FIGS. 10A-10D are schematic cross-sectional views showing different embodiments of a lubrication groove extending within the packing ring of FIG. 7 in accordance with at least some embodiments.

Grooves 350 may be formed in a number of different shapes. Referring now to FIG. 10A, in the embodiment of FIGS. 7-9, grooves 350 are each formed or defined by a pair of inclined planar surfaces 362 extending into carrier 334 from upper frustoconical surface 302, and a curved surface 361 extending between each of the inclined surfaces 362. Planar surfaces 362 are each inclined at an angle β relative to a plane extending parallel to or including the central axis (see FIGS. 7-9) with surfaces 362 being symmetrical across axis 355 of groove 350 (i.e., each surface 362 is a mirror image of the other surface 362 across axis 355 within each groove 350). The angle β may range between 5 and 30°, inclusive. In this embodiment, curved surface 361 is a circular cylindrical surface having its axis of curvature aligned with axis 355 of groove 350. In other embodiments, the curvature of surface 362 may be other than circular (e.g., elliptical, hyperbolic, etc.).

Figure 10B:
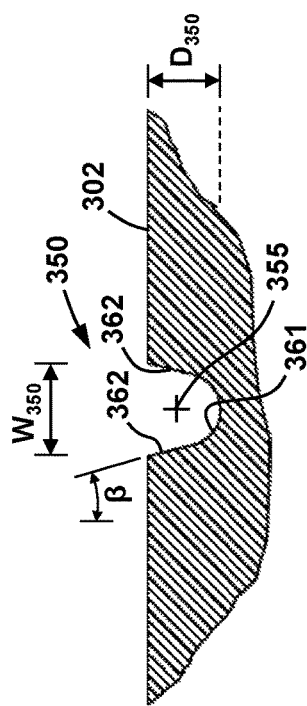
Figure 10C:
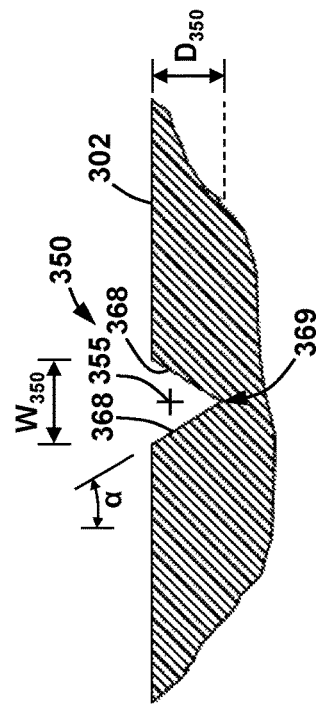
Figure 10D:
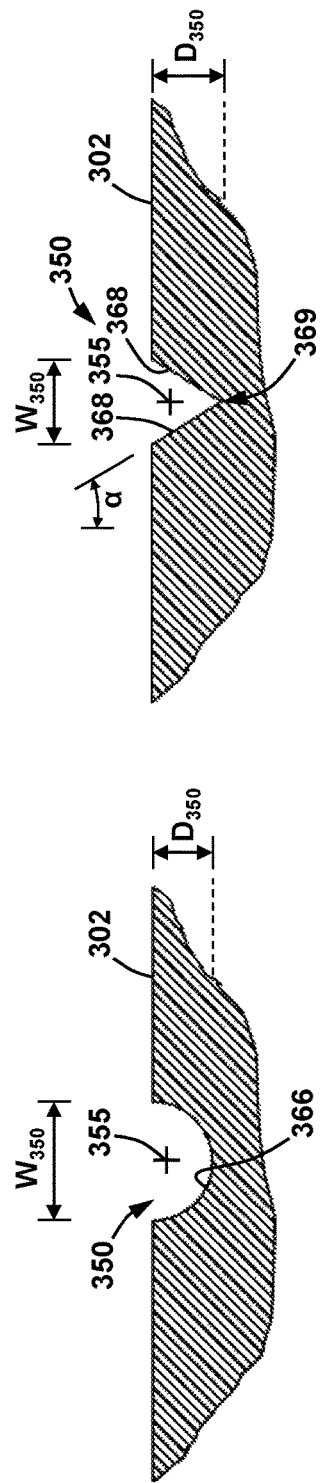

In other embodiments, grooves 350 may be formed in a wide variety of shapes other than that shown in FIG. 10A. For example, referring now to FIG. 10B, in some embodiments, one or more of the grooves 350 are rectangular in cross-section and thus include a pair of planar side surfaces 364 extending axially along axis 355 and a planar base surface 365 extending orthogonally to side surfaces 364 and axially along axis 355. In some embodiments, surfaces 364, 365 may all be the same sized such that groove 350 is square in cross-section; however, in other embodiments, base surface 365 may be smaller or larger than surfaces 364 such that groove 350 is rectangular in cross-section. Referring now to FIG. 10C, as another example, in some embodiments, one or more of the grooves 350 are defined by a single curved surface 366 extending inward from upper frustoconical surface 302. In this embodiment, curved surface 366 is a circular cylindrical surface that having an axis of curvature aligned with axis 355. However, it should be noted that in other embodiments, the curvature of surface 366 may be other than circular (e.g., elliptical, hyperbolic, etc.). Referring now to FIG. 10D, as still another example, in some embodiments, one or more of the grooves 350 may be triangular in cross-section and thus include a pair of inclined planar surfaces 368 that extend from upper frustoconical surface 302 to a junction 369. Planar surfaces 368 are each inclined at an angle α relative to a plane extending parallel to or including the central axis (see FIGS. 7-9) with surfaces 368 being symmetrical across axis 355 of groove 350 (i.e., each surface 368 is a mirror image of the other surface 368 across axis 355 within each groove 350). The angle α may range between 10 and 60°, inclusive.

In addition, as shown in FIGS. 10A-10D, regardless of the specific shape employed, groove 350 includes a maximum width $W_{350}$ and a maximum depth from upper frustoconical surface $D_{350}$. In some embodiments, width $W_{350}$ may range between 0.02 and 0.25 in, inclusive, and depth $D_{350}$ may range between 0.02 and 0.25, inclusive. In some embodiments, the number of grooves 350, as well as the maximum width $W_{350}$ and depth $D_{350}$ of grooves 350 is set to allow carrier 334 to maintain a sufficient amount of rigidity to withstand the axially compressive forces applied by the gland member (e.g., gland members 42, 64).

Figure 11:
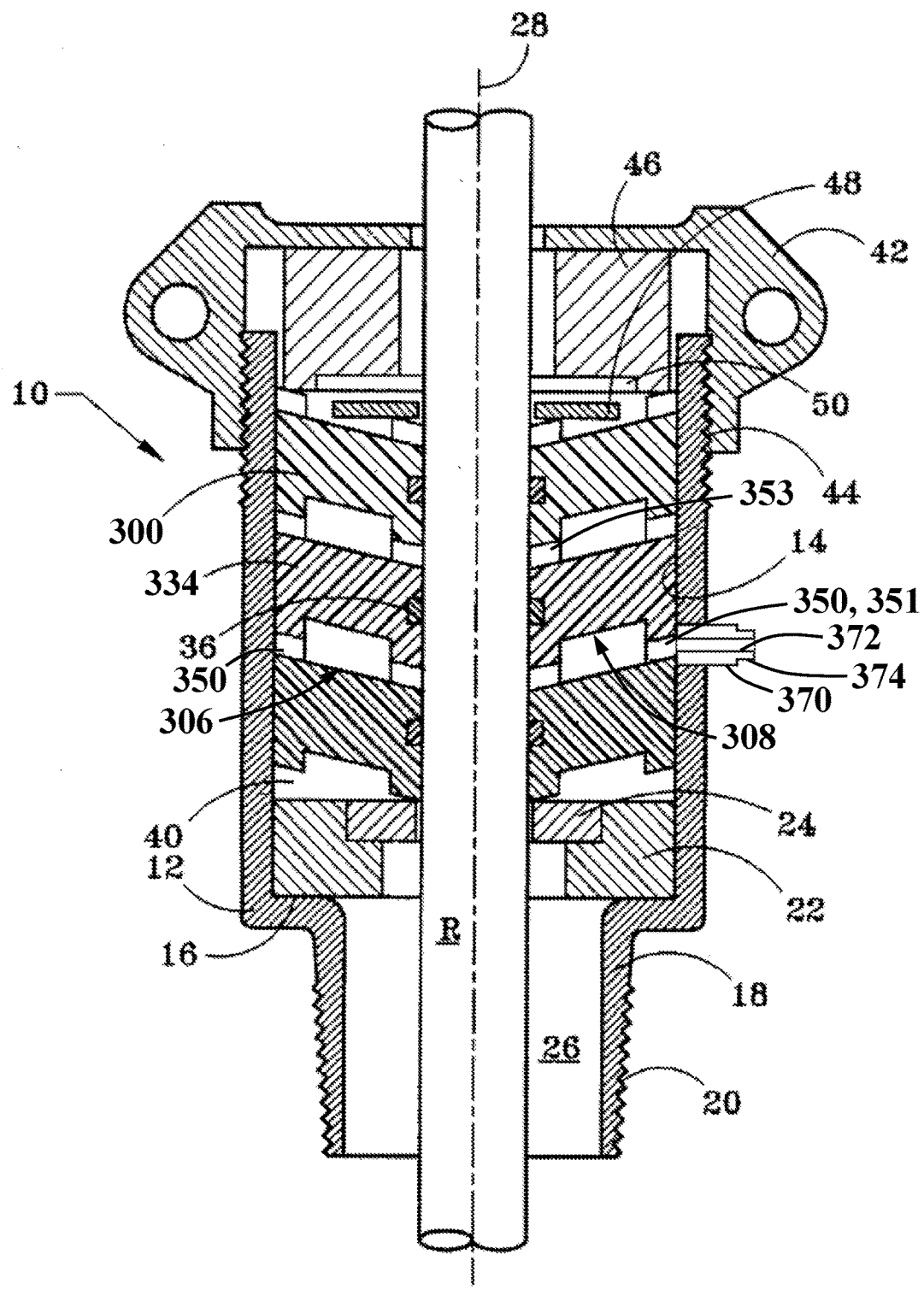
FIG. 11 is a side partial cross-section view of the stuffing box of FIG. 1 with a plurality of the packing rings of FIG. 7 installed therein in accordance with at least some embodiments.

Referring now to FIG. 11, packing rings 300 are shown installed within stuffing box 10, previously described above. During operations, lubricant (e.g., grease, oil, etc.) is injected into body 12 through a lubricant injection device 370, which is commonly referred to as a grease zerk, and includes a connector 374 for coupling to a source of lubricant (e.g., grease gun, tank, manifold, pipe, conduit, etc.) and an internal flow passage 372 communicating with each of the connector 374 and the internal cavity of body 12 (i.e., the cavity defined by internal surface 14). To provide lubrication to packing rings 300, lubricant is injected through internal flow passage 372 of injection device 370 in to the space radially between radially outer surfaces 334c of carriers 334 (see FIGS. 7-9) and internal surface 14 of body 12 (note: radially outer surface 334c is shown as a simple cylindrical surface in FIG. 11 as a matter of convenience). The lubricant is then free to flow through sections 351 of grooves 350 into the space defined by the upper and lower annular cavities 306, 308 of immediately axially adjacent packing rings 300 and finally through sections 353 of grooves 350 to rod R. Thereafter, lubricant may travel axially along rod R between the dynamic sealing rings 36 of axially adjacent packing rings 300 within stuffing box 10. In addition, during this process, lubricant is also free to migrate between the radially outer surface 334c and internal surface 14 of body 12. Thus, grooves 350 allow lubricant to easily travel radially inward through packing rings 300 to reciprocating rod R, and thereby enhance the delivery of lubricant to the engaged surfaces of packing rings 300 and rod R during operation. As a result, grooves 350 may help to reduce the friction between rings 300 and rod R such that the life of the packing rings 300 (e.g., carriers 334 and/or dynamic seals 36) may be increased. Moreover, the migration of lubricant between the radially outer surface 334c and internal surface 14 of body 12 also allows for easier removal of packing rings 300 from body 12 (e.g., during maintenance operations for stuffing box 10).

While only one (1) lubricant injection device 370 is shown in FIG. 11 as a matter of convenience, it should be appreciated that a plurality of lubrication injection devices 370 may extending through body 12 in various locations in other embodiments. In addition, in the embodiment of FIG. 11, packing rings 300 are shown to have a plurality of grooves 350 that all lie within the same axial plane (i.e., or plane including the central axis 28) as a matter of convenience; however, it should be appreciated that in other embodiments, none of the packing rings 300 includes a pair of grooves 350 that lie within the same axial plane. Also, in other embodiments, rings 300 are disposed within the internal cavity of body 12 such that grooves 350 of rings 300 all lie within different axial planes (i.e., the rings 300 are not placed in the same circumferential orientation). Further, while each of the rings 300 disposed within body 12 are shown in FIG. 11 to include grooves 350, it should be appreciated that in other embodiments, one or more of the rings 300 may not include grooves 350 (e.g., the topmost and/or the lower most rings 300).

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, in some embodiments, grooves 350 may extend through carrier ring 334 at a point or position that is axially disposed between upper and lower frustoconical surfaces 302, 304, respectively (e.g., at an axial midpoint between upper and lower ends 334a, 334b or just off set from the axial midpoint). In these embodiments, grooves 350 would instead resemble a port (e.g., circle, elliptical, rectangular, square, etc.) extending through carrier ring 334 between radially outer surface 334c and radially inner surface 334d. As another example, in still other embodiments, the radially outer surface 334c may be shaped such that surface 334c sealingly engages with internal surface 14 of body 12 near or proximate upper end 334a and/or lower end 334b.

Accordingly, the scope of protection is not limited to the embodiments described herein, but is only limited by the claims that follow, the scope of which shall include all equivalents of the subject matter of the claims.

What is claimed is:

1. A stuffing box for receiving a movable rod, comprising:
   a body including an internal surface defining an internal cavity;

a lubrication injection device mounted to the body and including an internal flow passage in communication with the internal cavity;

a plurality of packing rings stacked within the internal cavity, wherein each of the plurality of packing rings engages at least one adjacent packing ring within the stack and includes a carrier comprising:
a central axis;
a first end including a first frustoconical surface;
a second end opposite the first end, the second end including a second frustoconical surface that is parallel to and axially spaced from the first frustoconical surface;
a radially outer surface that extends between the first end and the second end and engages with the internal surface of the stuffing box;
a radially inner surface that extends between the first end and the second end;
an annular mounting recess extending into the radially inner surface; and
a plurality of lubrication grooves each extending from the radially outer surface to the radially inner surface and into the first frustoconical surface, wherein the lubrication grooves are angularly spaced about the central axis, and wherein each lubrication groove is configured to receive a lubricant therein to convey the lubricant between the radially outer surface and the radially inner surface;
a first annular cavity extending axially into the first frustoconical surface such that the first frustoconical surface is separated into a radially outer portion and a radially inner portion;
wherein each of the lubrication grooves extends through the first annular cavity such that each lubrication groove includes a first portion extending into the radially outer portion of the first frustoconical surface and a second portion extending into the radially inner portion of the first frustoconical surface;
wherein the first portion and the second portion of each lubrication groove is aligned along a corresponding axis that is parallel to the first frustoconical surface; and
a sealing ring mounted within the annular mounting recess of the carrier, wherein the sealing ring is configured to sealingly engage with an outer surface of the rod when the rod extends through the internal cavity;
wherein at least one of the lubrication grooves of at least one of the packing rings is in communication with the internal flow passage of the lubrication injection device.

2. The stuffing box of claim 1, wherein each carrier further comprises a cylindrical pocket extending axially into the first frustoconical surface at a position within the annular cavity.

3. The stuffing box of claim 2, wherein the plurality of lubrication grooves comprises at least five lubrication grooves angularly spaced about the central axis.

4. The packing ring of claim 1, wherein the plurality of lubrication grooves comprises at least five lubrication grooves.

5. The stuffing box of claim 4 wherein the plurality of lubrication grooves are evenly angularly spaced about the central axis.

6. The stuffing box of claim 1 wherein the radially outer surface of the carrier includes a first outer frustoconical surface, a second outer frustoconical surface, and an annular junction at the intersection of the first and second outer frustoconical surfaces; and wherein the first annular cavity comprises a base surface; and wherein the lubrication grooves are formed in the first outer frustoconical surface and are axially spaced from and do not intersect the base surface of the annular cavity.

7. The stuffing box of claim 1 wherein a first packing ring and a second packing ring of the plurality are stacked within the internal cavity such that the lubrication grooves of the carrier of the first packing ring lie in different axial planes from the lubrication grooves of the carrier of the second packing ring.

8. The stuffing box of claim 1 wherein the plurality of packing rings stacked within the internal cavity comprise a top and a bottom packing ring and wherein the carrier of at least one of the top and bottom packing ring is free of lubrication grooves.

9. The stuffing box of claim 1 further comprising a plurality of lubrication injection devices mounted to the body, and wherein each of the plurality of lubrication injection devices includes an internal flow passage in communication with the internal cavity.

10. A plurality of packing rings configured to be stacked within an internal cavity of a stuffing box body for sealingly engaging a rod that is movable with respect to the stuffing box body and that passes through the internal cavity, each packing ring comprising:
a carrier comprising:
a central axis;
a first end including a first frustoconical surface;
a second end opposite the first end and including a second frustoconical surface that is parallel to and axially spaced from the first frustoconical surface;
a radially inner surface that extends between the first end and the second end and an annular mounting recess in the radially inner surface;
a radially outer surface that extends between the first end and the second end and that includes a first outer frustoconical surface, a second outer frustoconical surface, and an annular junction at the intersection of the first and second outer frustoconical surfaces;
a first annular cavity extending axially into the first frustoconical surface such that the first frustoconical surface is separated into a radially outer portion and a radially inner portion;
a first plurality of lubrication grooves in the first frustoconical surface angularly spaced about the central axis and extending through the radially outer portion from the first outer frustoconical surface to the first annular cavity;
a second plurality of lubrication grooves in the first frustoconical surface angularly spaced about the central axis and extending through the radially inner portion from the first annular cavity to the radially inner surface; and
a sealing ring mounted within the annular mounting recess of the carrier and configured to sealingly engage the outer surface of the rod;
wherein the first and second plurality of lubrication grooves are configured to communicate lubricant from the internal surface of the stuffing box into the first annular cavity, and from the first annular cavity to the outer surface of the rod.

11. The plurality of packing rings of claim 10 wherein a first and a second packing ring of the plurality are disposed in a stack such that the first plurality of lubrication grooves of the carrier of the first packing ring lie in different axial planes from the first plurality of lubrication grooves of the carrier of the second packing ring.

12. The plurality of packing rings of claim 10 wherein, in the carrier of at least one packing ring of the plurality, each lubrication groove of the first plurality is aligned with a lubrication groove of the second plurality.

13. The plurality of packing rings of claim 10 wherein the first plurality of lubrication grooves comprises at least five lubrication grooves angularly spaced about the central axis.

14. The plurality of packing rings of claim 10 wherein the first plurality of lubrication grooves are evenly angularly spaced about the central axis.

15. The plurality of packing rings of claim 10 wherein, in at least one packing ring of the plurality, the first annular cavity comprises a base surface, and wherein the lubrication grooves of the first and second plurality of lubrication grooves are axially spaced from and do not intersect the base surface of the annular cavity.

16. The stuffing box of claim 10 wherein the plurality of packing rings comprises a top and a bottom packing ring, and wherein the carrier of at least one of the top and bottom packing ring is free of lubrication grooves.

\* \* \* \* \*